(12) United States Patent
McDonald et al.

(10) Patent No.: US 7,483,407 B2
(45) Date of Patent: Jan. 27, 2009

(54) METHOD FOR ALLOCATING BANDWIDTH ON A PLURALITY OF COMMUNICATION CHANNELS

(75) Inventors: Daniel J. McDonald, Cary, IL (US); Michael C. Petrie, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 222 days.

(21) Appl. No.: 11/533,888

(22) Filed: Sep. 21, 2006

(65) Prior Publication Data

US 2008/0075106 A1    Mar. 27, 2008

(51) Int. Cl.
*H04B 7/212* (2006.01)
*H04J 4/00* (2006.01)

(52) U.S. Cl. .................. 370/330; 370/337; 370/347

(58) Field of Classification Search .................. 370/436, 370/437, 442, 443, 458, 329, 330, 336, 337, 370/347

See application file for complete search history.

(56) References Cited

U.S. PATENT DOCUMENTS

| 6,064,662 | A  | * | 5/2000 | Gitlin et al. | 370/330 |
| 6,108,552 | A  | * | 8/2000 | Edwards et al. | 455/452.1 |
| 6,381,461 | B1 | * | 4/2002 | Besson et al. | 455/450 |
| 6,901,064 | B2 | * | 5/2005 | Cain et al. | 370/337 |
| 2002/0067709 | A1 | * | 6/2002 | Yamada et al. | 370/337 |
| 2006/0182142 | A1 | * | 8/2006 | Schmidt | 370/465 |

* cited by examiner

*Primary Examiner*—Min Jung
(74) *Attorney, Agent, or Firm*—Terri S. Hughes

(57) ABSTRACT

A device receives a communication request for a time division multiple access (TDMA) communication. Upon receipt of the communication request, the device identifies a first communication channel that currently has at least one available TDMA slot and that is currently supporting a greatest number of active TDMA communications amongst a plurality of communication channels. Once the device identifies the first communication channel, the device allocates a first available TDMA slot for the TDMA communication on the first communication channel.

15 Claims, 3 Drawing Sheets

METHOD FOR ALLOCATING BANDWIDTH ON A PLURALITY OF COMMUNICATION CHANNELS

FIELD OF THE INVENTION

The field of the invention relates to transmitting communications in networks and, more specifically, to allocating bandwidth on a plurality of communication channels for these communications.

BACKGROUND OF THE INVENTION

Mobile stations operate in various operating modes, use different technologies, and utilize different protocols as they move across different networks or across the same network. For example, mobile stations may operate according to frequency division multiple access (FDMA) or time division multiple access (TDMA) technologies. In other examples, mobile stations may operate according to full rate or half rate vocoder technologies.

These different modes may determine different operating characteristics of the mobile station. In one example, the operating mode determines whether the mobile station utilizes FDMA or TDMA technologies. Being able to operate the mobile station according to different modes allows the mobile station to operate more efficiently and effectively as it moves across different operational environments.

The bandwidth on a communication channel used to conduct communications between mobile stations and other devices can be divided or structured in a variety of different ways. For example, with TDMA communications, the communication channel bandwidth may be divided into time slots and different communications can be conducted within these time slots.

Unfortunately, situations exist where it is difficult or impossible to efficiently utilize the bandwidth of communication channels. For example, when assigning FDMA communications, the full bandwidth of a channel is required to conduct the communication. Existing wide area communication systems that support bandwidth allocation of TDMA communications to communication channels, such as the Motorola Dimetra IP solution, employ a bandwidth allocation algorithm in which TDMA communication requests are evenly distributed across all communication channels at a site. Consequently, in a mixed FDMA/TDMA system, if TDMA communications are assigned in an even distribution manner across all communication channels at a site, it becomes difficult to support a FDMA communication request since the entire communication channel must be free of communications in order to support the request. Therefore, if communication channels are not assigned efficiently in a mixed FDMA/TDMA system, FDMA communications may not be able to obtain the needed resources (i.e., the entire bandwidth of the communication channel) thus resulting in the FDMA communication being delayed or dropped.

In another example, secure TDMA communications typically require the distribution of call control signaling as well as, for example, encryption synchronization information. When two or more secure TDMA communications are assigned to the same communication channel, a substantial amount of bandwidth is needed for call control and encryption synchronization information. Consequently, when the secure TDMA communication is assigned to the same communication channel as active (on-going) TDMA communications, the amount of signaling information that can be distributed is greatly reduced. Therefore, if multiple TDMA secure communications are active on a communication channel, the amount of call control signaling bandwidth is greatly reduced resulting in reduced system capability.

As a result of these problems, bandwidth is often inefficiently used in current systems. This inefficient use of system resources causes delays with communications as well as other problems that lead to user frustration with current systems.

BRIEF DESCRIPTION OF THE DRAWINGS

The above needs are at least partially met through provision of a method for allocating bandwidth on a plurality of communication channels described in the following disclosure, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PRESENT INVENTION

A method is provided that allocates bandwidth on a plurality of communication channels in a communication system. The approaches described herein allocate bandwidth on a communication channel for a communication (such as a call) based upon the number of active (on-going) communications and the type of communications currently being supported by the communication channel. For example, the number of active TDMA communications may be determined for a plurality of communication channels and the communication channel having available bandwidth and the greatest number of active communications is selected to support the new TDMA communication. In the following examples, the communication channels are a frequency that can be allocated to support either a single FDMA communication or multiple TDMA communications (i.e., a mixed FDMA/TDMA system). In so doing, the efficiency of the operation of the system is enhanced, fewer delays or dropped/queued communications occur, and user satisfaction with the system is improved. Let us now turn to the figures and discuss the present disclosure in greater detail.

Figure 1:
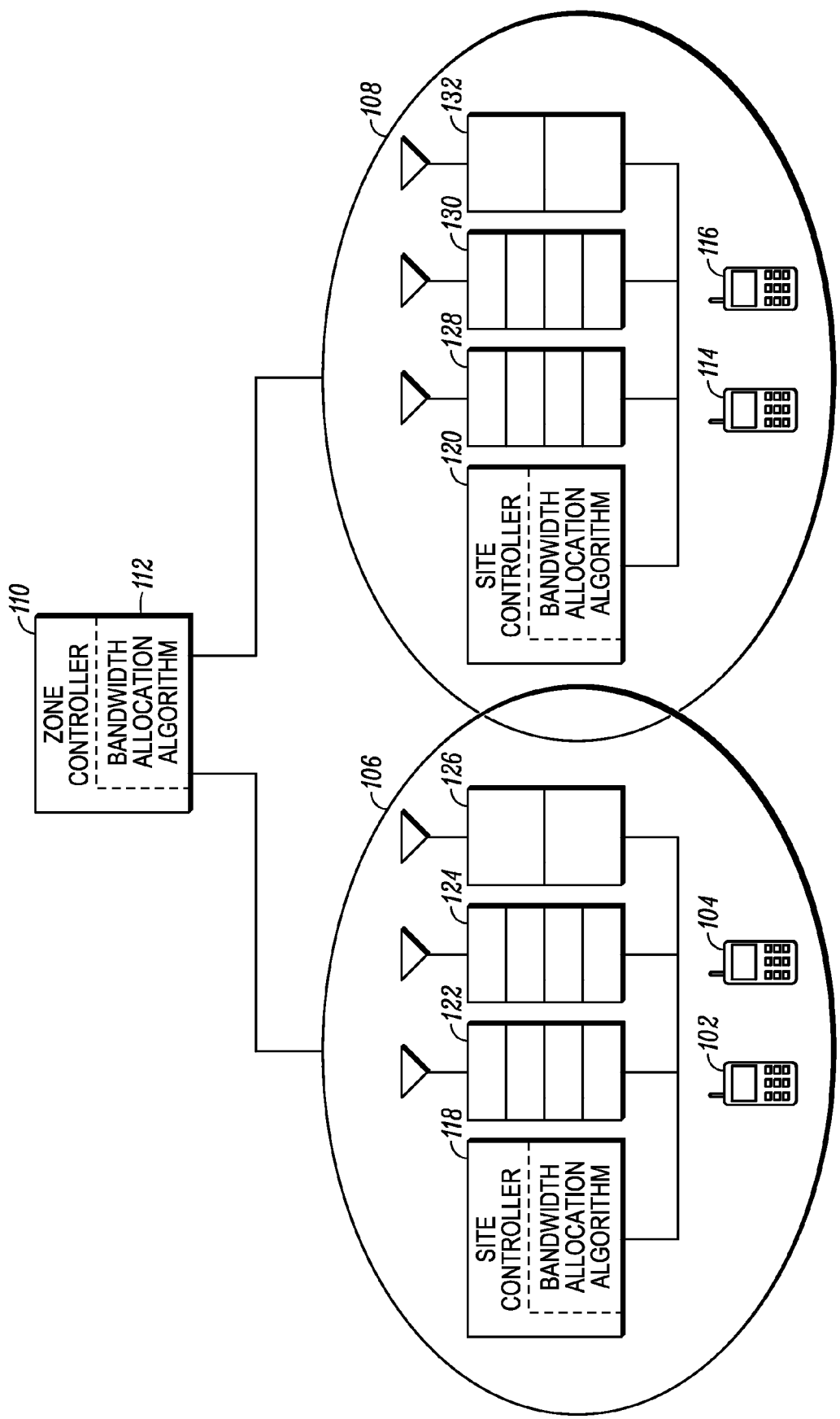
FIG. 1 is a block diagram of a system for allocating bandwidth on a plurality of communication channels for communications according to various embodiments of the present invention.

Referring now to FIG. 1, one example of a system for allocating bandwidth on a plurality of communication channels for communications is described. A first mobile station 102 and a second mobile station 104 operate at a first radio frequency (RF) communication site 106, and a third mobile station 114 and a fourth mobile station 116 operate at a second RF communication site 108. The first RF communication site 106 comprises a site controller 118 and a plurality of base stations 122, 124, and 126. The site controller 118 is coupled to the base stations 122, 124, and 126. The second RF communication site 108 comprises a site controller 120 and a plurality of base stations 128, 130, and 132. The site controller 120 is coupled to the base stations 128, 130, and 132.

The mobile stations 102, 104, 114, and 116 may be selected from a variety of different mobile communication devices. For example, the mobile stations 102, 104, 114, and 116 may be selected from a group consisting of, but not limited to, a two-way radio, a cellular telephone, a pager, a personal digital assistant, a personal computer, or the like. Additionally, the mobile stations 102, 104, 114, and 116 and the first and second RF communication sites 106 and 108 may operate according to any communication protocol or technology. For example, the mobile stations 102, 104, 114, and 116, the first RF communication site 106, and the second RF communication site 108 may operate in, but not limited to, a FDMA mode, a TDMA mode (e.g., 2-to-1 (also referred to as 2-slot) TDMA, 4-to-1 (also referred to a 4-slot) TDMA), full rate vocoder mode, half-rate vocoder mode, or combinations of these modes. Other examples of mobile stations and operating modes for these mobile stations are also possible and will be obvious to a person of ordinary skill in the art after reading the present disclosure.

The first RF communication site 106 and the second RF communication site 108 are coupled to a zone controller 110. In the examples of the present disclosure, the zone controller 110 comprises a communication channel bandwidth allocation algorithm 112 that determines the allocation of bandwidth amongst the plurality of communication channels for communications that it receives. The zone controller 110 stores the information concerning the bandwidth allocation, for example, in a memory device that may or may not be co-located at the zone controller 110. Alternatively, the communication channel bandwidth allocation algorithm 112 may be located at each of the site controllers 118 or 120, or any other suitable device in the system that is capable of allocating bandwidth amongst the plurality of communication channels for the incoming communication requests.

The base stations 122, 124, 126, 128, 130, and 132 transmit and receive communications from the mobile stations. In this example, the base stations 122, 124, 128, and 130 transmit and receive communications in a 4-slot TDMA mode, while the base stations 126 and 132 transmit and receive communications in a 2-slot TDMA mode. Additionally, any of the base stations 122, 124, 126, 128, 130, and 132 may transmit and receive communications in a FDMA mode. It will be appreciated that the modes used by the base stations 122, 124, 126, 128, 130, and 132 of FIG. 1 are for exemplary purposes only, and that any other type of mode or combination of modes may also be used by any of the base stations 122, 124, 126, 128, 130, and 132.

Figure 2:
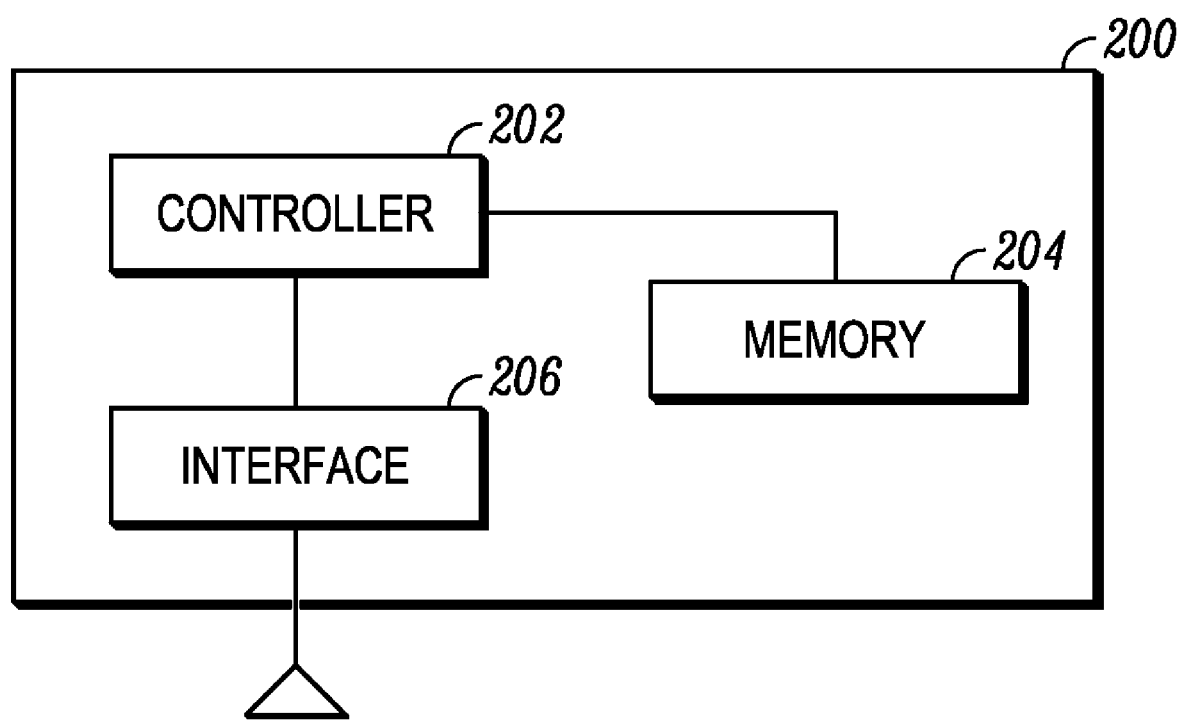
FIG. 2 is a block diagram of a device for allocating bandwidth on a plurality of communication channel for communications according to various embodiments of the present invention.

Referring now to FIG. 2, a device 200 for allocating bandwidth amongst the plurality of communication channels is described. In one example, the device 200 may be the zone controller 110. In another example, the device 200 may be the site controllers 118, 120. The device 200 includes a controller 202, memory 204, and interface 206. The interface 206 receives bandwidth allocation information.

In one example, the controller 202 obtains the current bandwidth allocation amongst the plurality of communication channels, which may be stored in the memory 204. The controller 202 uses this information to determine how to allocate the available bandwidth on the plurality of communication channels to the newly arriving communication requests. In this regard, for example, the controller 202 is further programmed to allocate an available time slot on a communication channel in order to transmit the newly received TDMA communication. In one approach, the bandwidth allocation may be made according to the algorithm of FIG. 3. In this approach, the device 200 packs the communication channel with as many TDMA communications as possible. In other words, the device 200 attempts to allocate bandwidth for the new TDMA communication on a channel where the new TDMA communication will completely use all the available bandwidth on the channel. For example, using this approach, for a 2-slot TDMA communication channel, the device 200 first attempts to allocate an available slot for the new TDMA communication on a communication channel that is currently supporting an active TDMA communication on the other slot before allocating the new TDMA communication to a communication channel that is currently not supporting any active TDMA communications. For a 4-slot TDMA communication channel, the device 200 first attempts to allocate an available TDMA slot for the new TDMA communication on a communication channel that is currently supporting three active (on-going) TDMA communications. If there are no communication channels currently supporting three active TDMA communications, then the device 200 attempts to allocate an available TDMA slot for the new TDMA communication on a communication channel that is currently supporting two active TDMA communications. If there are no communication channels currently supporting two active TDMA communications, then the device 200 attempts to allocate an available TDMA slot for the new TDMA communication on a communication channel currently supporting one active TDMA communication. Only if there are no communication channels currently supporting an active TDMA communication will the device 200 allocate bandwidth for the new TDMA communication on an empty or unallocated communication channel. This approach of packing the TDMA communications onto one communication channel increases the likelihood that other communication channels are free for use by other non-TDMA communication, such as a FDMA communication, which requires the entire bandwidth of the communication channel to be free and unallocated.

Figure 3:
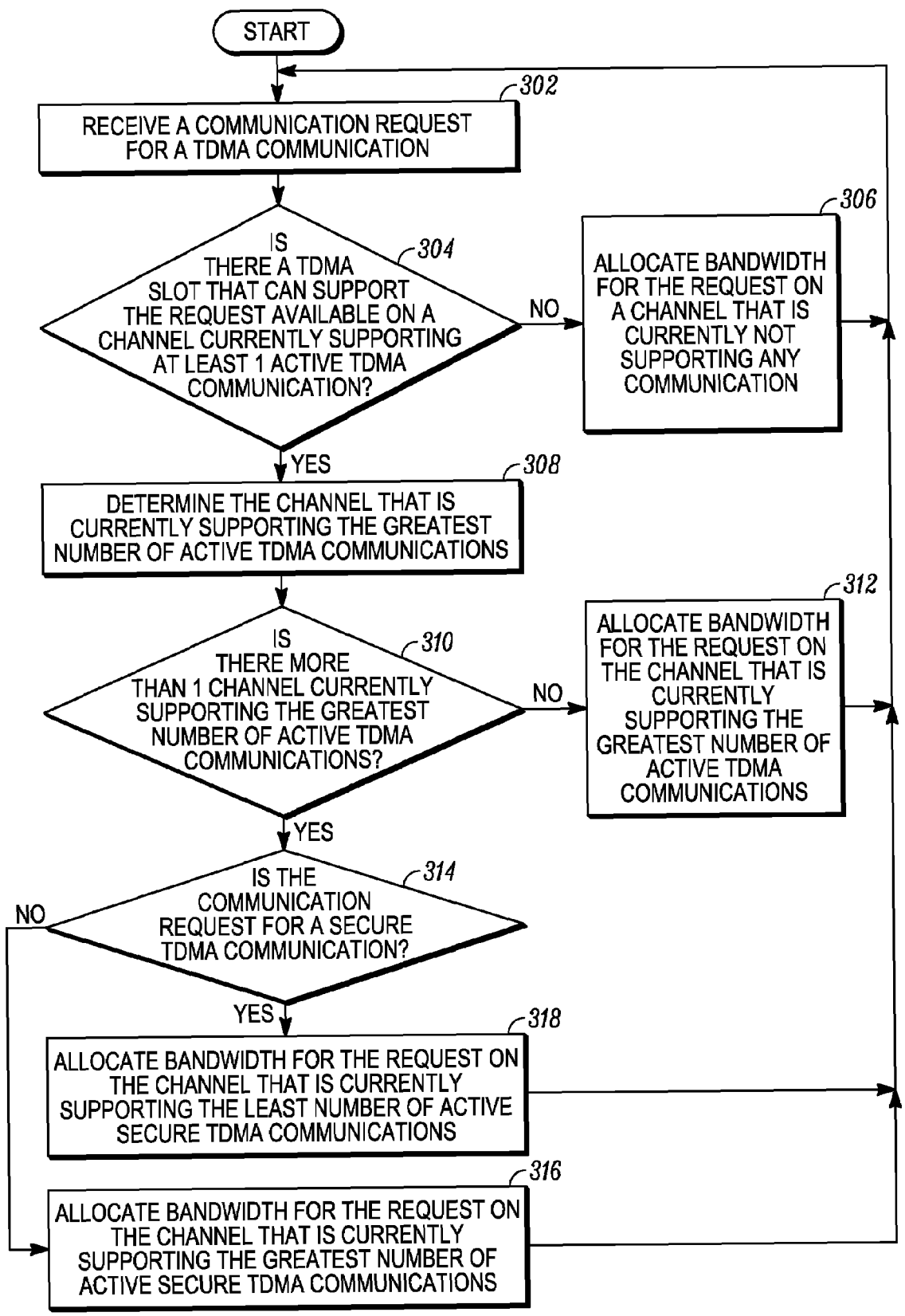
FIG. 3 is a flowchart of an approach for allocating bandwidth on a plurality of communication channels for communications according to various embodiments of the present invention.

Referring now to FIG. 3, an approach for allocating bandwidth on the plurality of communication channels to support the TDMA communications is described. For ease of explanation, as noted above, the examples depicted herein assume that the zone controller 110 allocates the bandwidth on the plurality of communication channels to support the communications, however, other suitable devices 200 may allocate the bandwidth amongst the plurality of communication channels.

In operation, the zone controller 110 receives a communication request for a TDMA communication at step 302. Upon receipt of the communication request, the zone controller 110 determines if a TDMA slot that can support the request is available on at least one of the plurality of communication channels that is currently supporting at least one active TDMA communication at step 304. If the zone controller 110 determines that none of the communication channels that is currently supporting at least one active TDMA communication have an available TDMA slot that can support the new communication request, then the zone controller 110 allocates bandwidth for the new TDMA communication received at step 302 to a communication channel that does not have any active communications but has at least one available TDMA slot that can support the new communication request at step 306. The zone controller 110 then waits to receive the next TDMA communication request. To further explain using an Example 1, let us assume that communication channel 1 is currently supporting one active FDMA communication; communication channels 2 and 3 are not currently supporting any active communications and communication channel 2 has 4 available TDMA slots that can support the new communication request and communication channel 3 has two available TDMA slots that can support the new communication request; and communication channel 4 is currently supporting four active TDMA communications but does not have any available TDMA slots. Based on the distribution of active communications and available TDMA slots on the plurality of communication channels that can support the new communication request in Example 1, the zone controller 110 allocates an available TDMA slot for the new TDMA communication on either communication channel 2 or communication channel 3. In some embodiments, in accordance with Example 1, the zone controller 110 can select between channel 2 and channel 3 by being further programmed to allocate bandwidth on the 2-slot TDMA channel prior to allocating bandwidth on the 4-slot TDMA channel, or verse visa.

If, however, the zone controller 110 determines that there is at least one communication channel that is currently supporting at least one active TDMA communication while still having an available TDMA slot that can support the new communication request, then the zone controller 110 determines which communication channel is supporting the greatest number of active TDMA communications while still having an available TDMA slot that can support the new communication request at step 308 (e.g., for the 4-slot TDMA communication channels, which communication channels are currently supporting 3 active TDMA communications, and if no communication channel currently supports 3 active TDMA communications, which communication channels are supporting 2 active TDMA communications, and so on). If there is only one communication channel that is currently supporting the greatest number of active TDMA communications while still having an available TDMA slot that can support the new communication request, then the zone controller 110 allocates the available TDMA slot on that communication channel to support the new TDMA communication at steps 310 and 312 and waits to receive the next TDMA communication request. To further explain using an Example 2, let us assume that communication channel 1 is currently supporting three active TDMA communications and has one available TDMA slot that can support the new communication request, communication channel 2 is currently supporting two active TDMA communications and has two available TDMA slots that can support the new communication request, communication channel 3 is not currently supporting any active communications and has two available TDMA slots that can support the new communication request, and communication channel 4 is currently supporting four active TDMA communications but does not have any available TDMA slots. Based on the distribution of active communications and available TDMA slots on each communication channel in Example 2, the zone controller 110 allocates the available TDMA slot on communication channel 1 to the new TDMA communication because communication channel 1 is currently supporting the greatest number of active TDMA communications (in this case 3) while still having an available TDMA slot that can support the new communication request.

There may be some instances where there is more than one communication channel that is currently supporting the greatest number of active TDMA communications while having at least one available TDMA slot that can support the communication request at step 310. In an Example 3, let us assume that communication channels 1 and 2 both are currently supporting three active TDMA communications and both have one available TDMA slot that can support the new communication request, while communication channel 3 is not currently supporting any active communications and has two available TDMA slots that can support the new communication request, and communication channel 4 is currently supporting four active TDMA communications but does not have any available TDMA slots. When this situation arises, the zone controller 110 must decide which communication channel from a subset of communication channels to allocate bandwidth on for the new TDMA communication. The subset of communication channels comprises all the communication channels that fulfill the requirements of currently supporting the greatest number of active TDMA communications while still having at least one available TDMA slot that can support the new TDMA communication request. It should be noted that the subset of communication channels can comprise all the communication channels if all the communication channels meet the requirements of currently supporting the greatest number of active TDMA communications while having at least one available TDMA slot that can support the new communication request. In Example 3, however, the subset of communication channels comprises only communication channel 1 and communication channel 2 since these are the only communication channels that fulfill the requirement in step 310 of currently supporting the greatest number of active TDMA communications while having at least one available TDMA slot that can support the new communication request.

The zone controller 110 determines at step 314 the type of TDMA communication received in the communication request received at step 302. As noted above, a TDMA communication may take a variety of forms and have various characteristics. For example, the TDMA communication may be non-secure (e.g., clear) or secure (e.g., encrypted, scrambled, etc.). Thus, if the new communication request received at step 302 is for a non-secure TDMA communication, the zone controller 110 allocates bandwidth for the new TDMA communication on the communication channel that is part of the subset of communication channels that has the greatest number of active TDMA communications and is currently supporting the greatest number of active secure TDMA communications while having at least one available TDMA slot that can support the new communication request. If, on the other hand, the communication request received at step 302 is for a secure TDMA communication, the zone controller 110 allocates bandwidth for the new TDMA communication on the communication channel that is part of the subset of communication channels that has the greatest number of active TDMA communications and is currently supporting the least number of active secure TDMA communications while having at least one available TDMA slot that can support the new communication request. Thus, before the zone controller 110 can allocate bandwidth for the new TDMA communication on the correct communication channel, the zone controller 110 determines the type of TDMA communications that are currently active for each communication channel that is part of the subset of communication channels.

Referring back to Example 3, let us further assume that communication channel 1 is currently supporting two secure TDMA communications and one non-secure communication, while communication channel 2 is currently supporting three non-secure TDMA communications. If the communication request received in step 302 is for a non-secure TDMA communication, the zone controller 110 allocates the available TDMA slot on communication channel 1 for the new TDMA communication at step 316 since communication channel 1 supports the greatest number of active TDMA communications having the greatest number of secure TDMA communications. The zone controller 110 then waits to receive a new TDMA communication request. Still referring to Example 3, if, on the other hand, the communication request received in step 302 is for a secure TDMA communication, the zone controller 110 allocates the available TDMA slot on communication channel 2 for the new TDMA communication at step 318 since communication channel 2 supports the greatest number of active TDMA communications having the least number of active secure TDMA communications. The zone controller 110 then waits to receive a new TDMA communication request.

Thus, approaches are provided herein that allocate bandwidth for communications on a plurality of communication channels based upon how many active communications are currently being supported by each of the plurality of communication channels and the types of the active communications that are currently being supported by each communication channel. Using these approaches, the efficiency of the operation of the system is enhanced, fewer delays or dropped communications occur, and user satisfaction with the system is enhanced.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of allocating bandwidth on a plurality of frequency channels, the method comprising the steps of:
   receiving a communication request for a time division multiple access (TDMA) communication;
   upon receipt of the communication request, identifying a first frequency channel that currently has at least one available TDMA slot and is currently supporting a greatest number of active TDMA communications amongst the plurality of frequency channels; and
   allocating a first available TDMA slot for the TDMA communication on the first frequency channel.

2. The method of claim 1 wherein each of the plurality of frequency channels can support a plurality of TDMA communications or at least a single non-TDMA communication.

3. The method of claim 2 wherein the non-TDMA communication is a frequency division multiple access (FDMA) communication.

4. The method of claim 1 wherein the TDMA communication is non-secure.

5. The method of claim 1 wherein the TDMA communication is secure.

6. The method of claim 5 wherein the TDMA communication is encrypted.

7. The method of claim 5 wherein the TDMA communication is scrambled.

8. A method of allocating bandwidth on a frequency channel, the method comprising the steps of:
   receiving a communication request for a secure time division multiple access (TDMA) communication;
   upon receipt of the communication request, determining that a first frequency channel and a second frequency channel each currently have at least one available TDMA slot and each currently supports a greatest number of active TDMA communications amongst the plurality of frequency channels; and
   allocating a first available TDMA slot for the secure TDMA communication on either the first frequency channel or the second frequency channel that currently supports a least number of secure TDMA communications.

9. The method of claim 8 wherein each of the plurality of frequency channels can support a plurality of TDMA communications or at least a single non-TDMA communication.

10. The method of claim 9 wherein the non-TDMA communication is a frequency division multiple access (FDMA) communication.

11. The method of claim 8 wherein the TDMA communication is encrypted.

12. The method of claim 8 wherein the TDMA communication is scrambled.

13. A method of allocating bandwidth on a frequency channel, the method comprising the steps of:
    receiving a communication request for a non-secure time division multiple access (TDMA) communication;
    upon receipt of the communication request, determining that a first frequency channel and a second frequency channel each currently have at least one available TDMA slot and each currently supports a greatest number of active TDMA communications amongst the plurality of frequency channels; and
    allocating a first available TDMA slot for the TDMA communication on either the first frequency channel or the second frequency channel that currently supports a greatest number of active secure TDMA communications.

14. The method of claim 13 wherein each of the plurality of frequency channels can support a plurality of TDMA communications or at least a single non-TDMA communication.

15. The method of claim 14 wherein the non-TDMA communication is a frequency division multiple access (FDMA) communication.

* * * * *